United States Patent [19]
Dunfield et al.

[11] Patent Number: 5,936,410
[45] Date of Patent: Aug. 10, 1999

[54] HYDRODYNAMIC BEARING INCLUDING MEANS FOR MONITORING THE CAPACITANCE BETWEEN THE ROTOR AND STATOR OF A HYDRODYNAMIC BEARING

[75] Inventors: John C. Dunfield, Chatsworth; Gunter K. Heine, Aptos, both of Calif.

[73] Assignee: Seagate Technology, Inc., Scotts Valley, Calif.

[21] Appl. No.: 08/838,648

[22] Filed: Apr. 9, 1997

Related U.S. Application Data

[63] Continuation of application No. PCT/US97/01051, Jan. 24, 1997.

[51] Int. Cl.[6] .................................................. G01R 27/26

[52] U.S. Cl. ........................................... 324/662; 324/686

[58] Field of Search ..................................... 324/658, 661, 324/662, 663, 665, 672, 679, 686, 690

[56] References Cited

U.S. PATENT DOCUMENTS

| | | | |
|---|---|---|---|
| 4,823,071 | 4/1989 | Ding et al. | 324/662 |
| 5,402,680 | 4/1995 | Korenaga | 324/662 |
| 5,513,539 | 5/1996 | McLaughlin et al. | 324/662 |

*Primary Examiner*—Diep N. Do
*Attorney, Agent, or Firm*—Flehr Hohbach Test Albritton & Herbert LLP

[57] ABSTRACT

A hydrodynamic bearing is disclosed which includes a shaft and a rotor rotating relative to one another and defining a hydrodynamic bearing in the gap between the relatively rotating parts. Also disclosed is a method for identifying or signaling potential failure of the hydrodynamic bearing. The method for identifying or signaling potential failure includes a capacitance detector for generating a signal representing the capacitance across the gap defining the hydrodynamic bearing, a comparator for comparing the capacitance to an established threshold, and an indicator for providing a signal indicating that operation of the information storage device incorporating the hydrodynamic bearing should continue or that an interruption is likely.

9 Claims, 3 Drawing Sheets

HYDRODYNAMIC BEARING INCLUDING MEANS FOR MONITORING THE CAPACITANCE BETWEEN THE ROTOR AND STATOR OF A HYDRODYNAMIC BEARING

This is a continuation of PCT/US97/01051, filed Jan. 24, 1997.

FIELD OF THE INVENTION

The present invention relates to the field of hydrodynamic bearing assemblies, and more specifically to means for monitoring the life expectancy of a hydrodynamic bearing for monitoring internal conditions in a hydrodynamic bearing, and for detecting shocks imposed on a hydrodynamic bearing.

BACKGROUND OF THE INVENTION

Disc drive memory systems have been used in computers for many years for storage of digital information. Such information is recorded on concentric memory tracks of a magnetic disc medium, the information being stored in the form of magnetic transitions of the medium. The discs themselves are rotatably mounted on a spindle, the information being accessed by means of read/write head support on a pivoting arm which moves radially over the surface of the disc. The read/write heads, or transducer, must be accurately aligned with the storage tracks on the disc to ensure proper reading and writing of the information. Thus, no tilt or wobble of the disc can be tolerated.

During operation, the discs are rotated at a very high speed within an enclosed housing by means of an electric motor generally located inside the hub or below the discs. The typical motor in current disc drive design is known as an in-hub or in-spindle motor. Such in-spindle motors, in order to minimize the size of the motor, incorporate a hydrodynamic bearing which supports the rotor for rotation around the shaft. Such hydrodynamic bearing are disclosed, for example, in U.S. patent application Ser. No. 08/472,338, filed Jun. 7, 1995, U.S. Pat. No. 5,685,674 entitled "SINGLE PLATE HYDRODYNAMIC BEARING WITH SELF-BALANCING FLUID LEVEL AND FLUID CIRCULATION" by Hans Leuthold, et al. assigned to the Assignee of the present invention and incorporated herein by reference.

In such bearings, a lubricating fluid functions as an actual bearing surface between a stationary base or housing and the rotating spindle or hub and the surrounding stationary portion of the motor. Over time, it is possible that the physical surfaces of the spindle and housing could contact one another, leading to an increased wear and eventual failure of the bearing system. Equally seriously, loss of the seal holding the lubricant within the bearing system or failure to control the lubricant level, or evaporation of the lubricant, or deterioration of the quality of the lubricant, could also cause the effectiveness of the bearing to diminish as the rotating part would no longer be held stable relative to the stationary part. This lack of stability would, over time, translate into what is termed "non-repeatable runout" in the rotating disc, making it difficult for the transducer to follow the tracks on which data is to be read and written. Thus, it is important to develop methods and systems for monitoring the performance of the hydrodynamic bearing.

A further critical issue in the design of hydrodynamic bearings is to maintain the stiffness of the hydrodynamic bearing. The stiffer the bearing, the higher the natural frequencies in the radial and axial direction of the motor, so that the more stable is the track of the disc on which reading and writing occurs. Thus, monitoring of the stiffness of the bearing is very important in evaluating the life of the hydrodynamic bearing so that the rotating load or disc is stably and accurately supported without wobble or tilt.

Yet, another problem with disc drive motors using hydrodynamic bearings is sensitivity to shock because of the lack of mechanical contact between the relatively moving parts. In view of this, a sensitive shock detector must be included in such disc drives, to interrupt data recording until the shock has passed. However, such shock detectors constitute extra expense and are not easily calibrated with the operating status of the hydrodynamic bearing.

A further desirable feature in disc drive motors is monitoring of operating temperature. However, this has also been difficult to achieve without adding extra components to the motor or disc drive.

SUMMARY OF THE INVENTION

It is an objective of the present invention to provide a method and apparatus for monitoring the performance and quality of a hydrodynamic bearing.

It is a further objective of the invention to provide a method and apparatus for detecting any tilt or wobble in the bearing which may be conveyed to the load being supported, typically a rotating disc.

It is a further objective of the invention to provide a method and apparatus for monitoring the stiffness of the bearing, an especially important criteria in rotating disc information storage systems.

It is a further objective of the invention to provide a method and apparatus for monitoring the effectiveness of the bearing in maintaining the fluid supporting the relative rotation of the parts, as well as monitoring the continuous quality of the fluid.

Another objective of the invention is to monitor changes in the temperature of the bearing fluid by monitoring changes in the dielectric constant of the fluid in the gap.

A related objective of the invention is to provide means and method for sensing changes in the quality and stability of the bearing and or bearing fluid so that the data can be backed up in an information storage system before failure of the bearing.

A further and related objective of the invention is to provide for a real-time warning of a shock being imposed to the system which affects the stability of the hydrodynamic bearing, so that operation of the system can be interrupted until the system has recovered from the shock.

These and other objectives of the present invention may be achieved by monitoring the capacitance between the rotor and a stationary part of the motor, typically taking the rotor as the ground side of the capacitor. A lack of stiffness or stability in the bearing would cause a change in the capacitance because the gap distance between the rotor and stator, which serve as the plates of the capacitor, would occur. By sensing changes in the capacitance, a determination can be made that a bearing is near end of life, i.e. that the required stiffness or stability in the bearing is not being provided. Further, in a related approach, an alternation in the capacitance of the bearing could be used to establish that the quality of the hydrodynamic bearing fluid is dissipating, or that its quantity is reduced, or that its temperature has changed from a normal operating temperature. These conclusions could be drawn because changes in the fluid quality alter the dielectric constant of the bearing fluid and therefore the capacitance.

In a related approach, a sudden change in the capacitance exhibited by the hydrodynamic bearing could reflect a shock imposed to the system, as the distance between the "plates" would change. Detection of such a sudden change in capacitance could be sensed, and used to interrupt operation of the associated system until the return of the capacitance to its normal level indicates that recovery from the shock has been achieved.

The above stated objectives and other features and advantages of the present invention will become more apparent to a person of skill in the art who studies the present invention disclosure given with reference to the following figures.

DETAILED DESCRIPTION OF A PREFERRED EMBODIMENT

Figure 1:
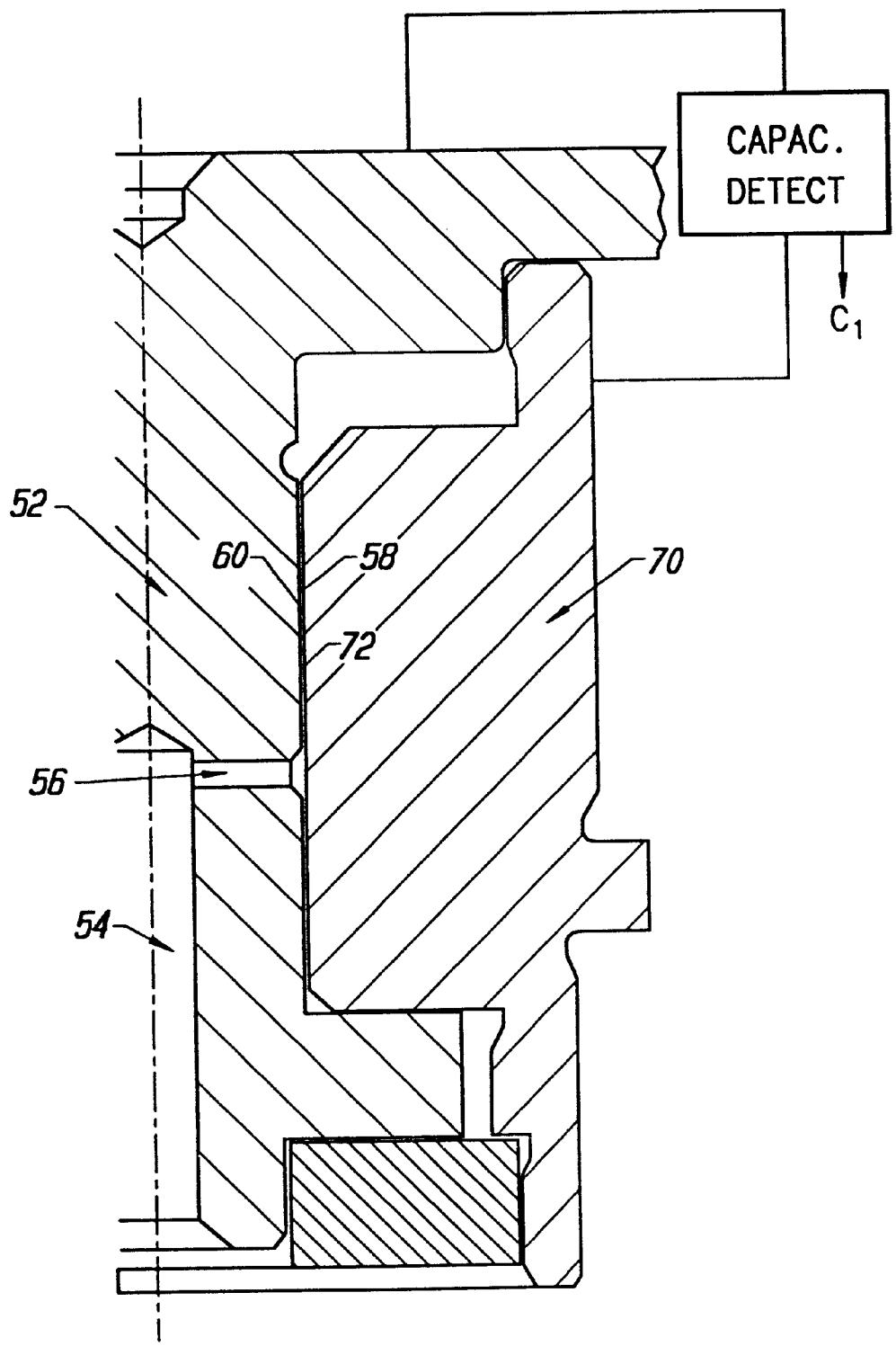
FIG. 1 is a vertical sectional view of a motor with a dynamic bearing in which the present invention is useful.

FIG. 1 illustrates a motor incorporating a hydrodynamic bearing in which the present invention may be used. Use of the design is not limited to motors of the type shown in FIG. 1, nor to hydrodynamic bearings of the type shown in the figure.

FIG. 1 includes a shaft 50 which is rotating past a fixed bushing 70. Rotating shaft 50 includes a reservoir 54 which supplies fluid through a groove 56 to the gap 58 which is defined between the two relatively rotating surfaces 60, 72. It is the objective of this invention to measure the capacitance across this gap 58 and monitor that capacitance. Any change in the capacitance value either short term, or long term, can be analyzed by appropriate circuitry (to be discussed below) either to indicate a tendency toward long term degradation or failure of the hydrodynamic bearing, or to sense a shock imposed on the bearing.

The principles to be discussed below are equally applicable to fixed shaft hydrodynamic bearings. Further, details of electronics for detecting the capacitance across a gap G between two relatively rotating parts as well as for making electrical contact to each of a rotating and stationary part are well within the skill of the field, and are not disclosed in greater detail beyond what is shown and described below.

If it is assumed for purposes of this discussion, that if the rotor is at ground potential, then the capacitance between a fixed and moving part can be measured based on either of the following equations:

$$C = \frac{AE_0E_r}{G}$$

wherein
C is the capacitance;
A is the surface area of the capacitor plate;
$E_0$ is a permeability constant utilized to rationalize the units; and
$E_R$ is a dielectric constant and G is the gap between the two plates of the capacitor.

Alternatively, the capacitance could be measured using the formula:

$$C = \ln\left(\frac{D_1}{D_0}\right)E_O E_R L$$

wherein
L is the length of the hydrodynamic bearing;
$D_1$ is the outer diameter of the circular capacitor;
$D_0$ is the inner diameter of the circular capacitor.

In either case, it is important to remember that the circuitry of the invention intended to sense changes in capacitance, rather than determine the value of the capacitance accurately, per se.

Figure 2:
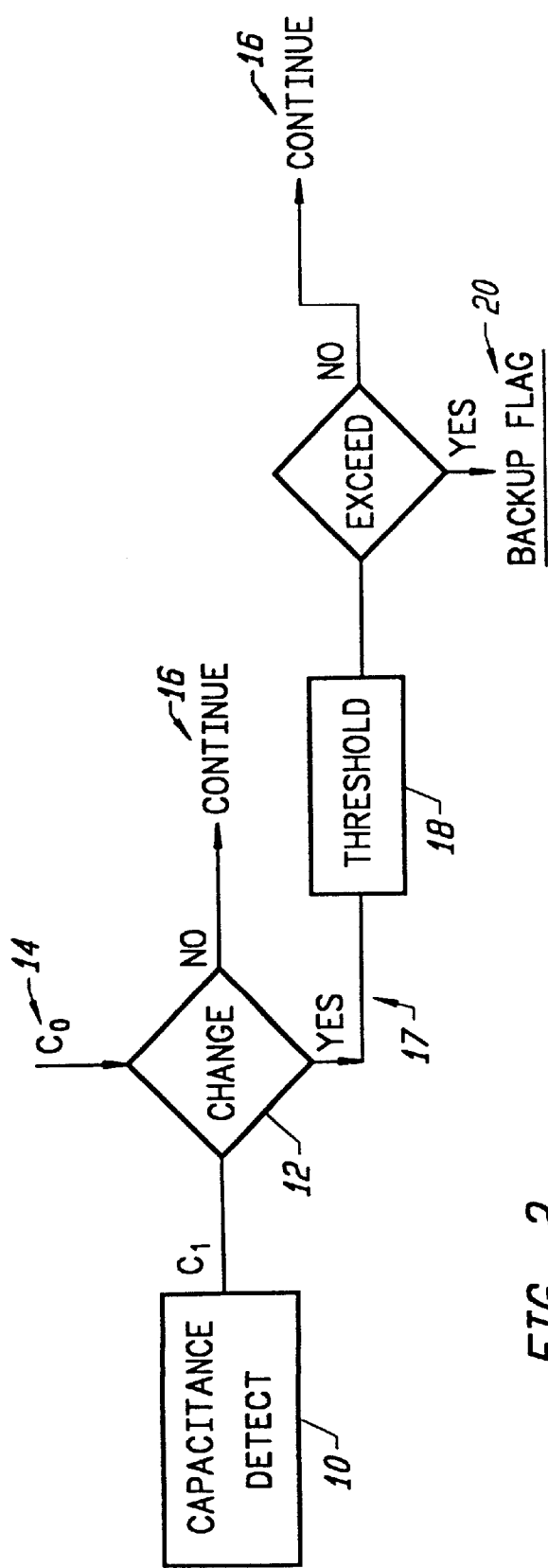
FIG. 2 is a block diagram of a circuit which may be used to monitor capacitance exhibited by the hydrodynamic bearing and generate a signal indicating changes in the capacitance.

Thus, for example, referring to FIG. 2, the output of the capacitance detector 10 is one input to a comparator circuit 12 which also receives a standard capacitor value input signal 14. So long as no substantial change in the base line value of the capacitance is detected by the change comparator circuit 12, then a continue signal 16 is the only output from circuit 12, and the information storage system or disc drive continues to operate. If a change in the capacitance is detected, then the value of the change from the established level is evaluated at a threshold circuit 18. If the threshold is not exceeded, then the continue signal 16 remains in effect, and the disc drive or other information storage system continues to operate. If the threshold is exceeded, indicating that a change in capacitance has been detected which has been established as being greater than should be tolerated, then a backup flag 20 is set. This causes the information storage system to immediately backup the information stored on the disc drive, or to signal an indication that the operator of the system should immediately backup all the stored information so that backup is carried out before failure.

Figure 3:
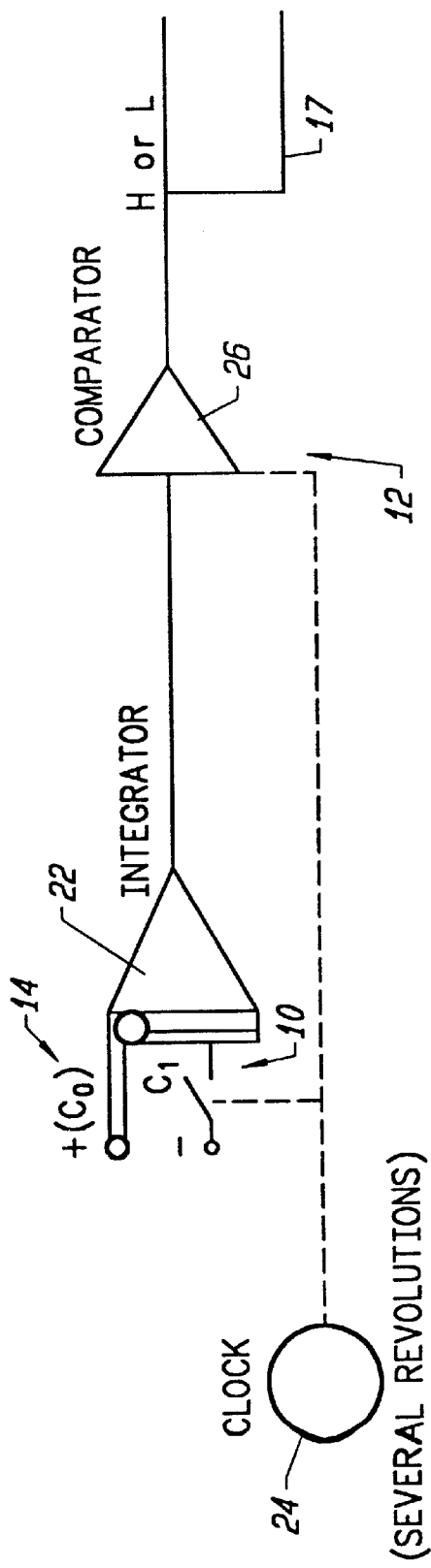
FIG. 3 is a schematic representation of a further alternative embodiment of a circuit for monitoring capacitance.

An example of a useful comparator circuit 12 is shown in FIG. 3, wherein an integrator 22 receives as one input a standard value which has been previously established 14 and the other input receives the value 10 representing the detected capacitance C1. This input 10 is integrated over several revolutions of the hydrodynamic bearing as controlled by a clock 24. The output of the integrator is then supplied to a comparator 26 which determines whether the integrated result, as compared to the standard signal 14, is within tolerable limits, or has exceeded tolerable limits. If it has exceeded the limit, then an analog signal 17 representative of the value of the output of the integrator is supplied to the threshold circuit 18.

In the preferred embodiment, the initial charge C0 is integrated down, where the integrator uses the R plus the capacitance C1 from the hydrodynamic bearing. After a time interval determined by the clock 24, the comparator 26 indicates whether the capacitance now being indicated by the output of the integrator is acceptable or not.

By using this approach, the dissipation factor of the capacitor can be accounted for and contaminated oil can also be sensed by the fact that the capacitance C1 integrated over a period of time and detected by this system would be modified.

A further extension of this concept can be used to monitor operating temperature of a hydrodynamic bearing used in a spindle motor or similar environment. Based on the recognition that changes in temperature affect viscosity of the hydrodynamic bearing fluid, a value representing changes in viscosity can also be monitored by this method and apparatus.

That is, a baseline value for the hydrodynamic bearing operating at optimum temperature is established experimentally. Changes in temperature of the bearing will alter fluid viscosity, which in turn will alter the dielectric constant $E_R$ of the fluid. This in turn will produce a measurable change in capacitance across the bearing gap, since $E_R$ is a part of the formula described above, and the fluid is the dielectric of a capacitor whose plates are the shaft 52 and sleeve 70. Thus, significant changes in fluid temperature will alter the capacitance to a measurable extent. This change in capacitance-representing value from the baseline value will be detectable and measurable by the method described above.

It should also be noted that the capacitance sensor described herein could also be used for air bearing type hydrodynamic motors where the dielectric constant $E_r$ is 1, although changes in fluid constant $E_R$ would not appear; changes in gap width G would need to be monitored.

This detector in a further modification could be used for real-time shock warning as well. It is known that disc drives typically utilize shock sensors, which interrupt recording of data upon sensing of a shock, which may cause displacement of the transducer from the track, with recording being resumed when the shock has passed. Thus, a further advantage of this design is that the same circuitry could be used to replace the separate shock sensor. Continuous sampling of the capacitance as indicated by the output of the capacitance detector C1 would show a modulation of the value of C1 over the cycle. The output of the threshold device 18 could be thresholded to establish a potential contact under shock, causing normal operations to be suspended. The status of the suspended operation could be reported, and normal operation resumed after the capacitance response returns within acceptable levels as represented by a continue signal 16 resuming as the output from the threshold device.

Figure 4:
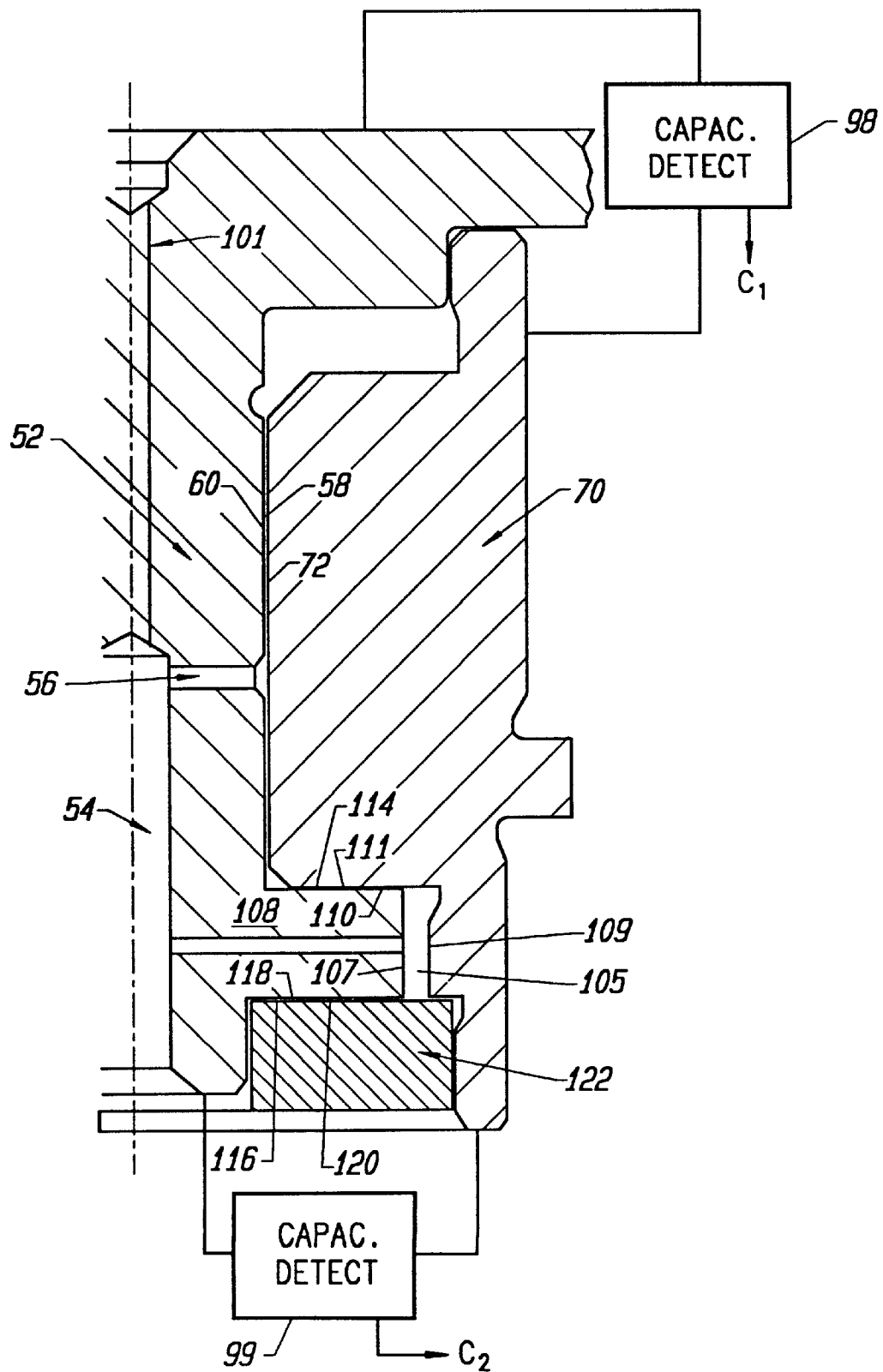
FIG. 4 is a schematic representation of a modification to the above described approach which may be used to monitor both the life of the hydrodynamic bearing, and detect any shocks imposed to the bearing.

In a further approach, by providing insulation 101 down the center of the shaft 52, two separate capacitors are created allowing for detection of two separate capacitance values C1, C2 as indicated in FIG. 4 by capacitance detectors 98, 99. The insulation must extend across the full width of the shaft and from top to bottom. Alternatively, and probably with more accurate results, a layer of insulation 103 could extend horizontally through the thrust plate from the center reservoir 54 to outer gap 105 defined between an end 107 of the thrust plate 108 and an inner surface 109 of the sleeve 70. In this embodiment, the capacitance across gap 111 between the top surface 110 of thrust plate 108 and the facing surface 114 of sleeve 70 is compared with the capacitance across gap 116 between the bottom surface 118 of thrust plate 108 and the facing surface 120 of counterplate 122. Any tilting of the shaft 52 and/or the counterplate 108 relative to the surrounding sleeve 70 would immediately be expressed as a change in both capacitance values C1 and C2, providing a much more sensitive detector. This measurement of C1 and C2 gives the possibility of doing two of the above tasks in an alternative manner. Further, position information, i.e. slight displacements of the shaft 52 relative to the bushing or sleeve 70 could be detected by comparison of the values Cl and C2. That is, the values should typically be equal. By comparing the values C1 and C2, a more pronounced alteration in the capacitance value could be detected, making for a more sensitive detector. Further, this system could be used to sense position information in a suspension system incorporating an active magnetic bearing, such as shown in Dunfield, U.S. Pat. No. 5,524,986 issued Jun. 11, 1996 entitled "Fluid Retention Principle for Hydrodynamic Bearings", assigned to the assignee of the present invention, and incorporated herein by reference. This information could be used to provide feedback to maintain the facing poles of a magnetic bearing in alignment.

Other features and advantages of the present invention could be determined by a person of skill in the art, as well as alterations to the preferred embodiments disclosed herein. Therefore, the scope of the present invention is to be limited only by the following claims:

What is claimed is:

1. A hydrodynamic bearing comprising a shaft and a rotor rotating relative to one another, said hydrodynamic bearing including a gap between said relatively rotating parts, and a means for identifying or signaling potential failure of the hydrodynamic bearing comprising:

a capacitance detector whose plates comprise the two relatively facing surfaces of said shaft and said rotor for generating a signal representing the capacitance across the gap defining said hydrodynamic bearing; and a comparator for comparing said capacitance to an established threshold; and an indicator for providing either a continue signal and a potential failure signal indicating that operation of the information storage device incorporating said hydrodynamic bearing should continue or that an interruption is likely, respectively.

2. A failure detection system as claimed in claim 1 wherein said threshold comparator includes an integrator having a first signal representing a standard level, and a second input receiving said signal representing capacitance across said gap of said hydrodynamic bearing, an output signal of said integrator being compared to a standard to establish said continue signal and said potential failure signal.

3. A failure indicator as claimed in claim 2 wherein said integrator includes means for integrating said capacitance signal from said hydrodynamic bearing over a period of time to compare said signal to said preset standard.

4. A hydrodynamic bearing comprising a shaft and a sleeve rotating relative to one another and including a gap between said relatively rotating shaft and sleeve, and a fluid in said gap, and a means for monitoring a quality of said fluid in said gap comprising:

a capacitance detector for generating a signal representing capacitance across said gap formed by said shaft and said shield and defining said hydrodynamic bearing;

a comparator for comparing said capacitance to an established threshold; and an indicator for providing a signal indicating the quality of said fluid relative to an established standard.

5. A failure detection system as claimed in claim 4 wherein said threshold comparator includes an integrator having a first signal representing a standard level, and a second input receiving said signal representing capacitance across said gap of said hydrodynamic bearing, an output signal of said integrator being compared to a standard to establish said continue signal and said potential failure signal.

6. A failure indicator as claimed in claim 5 wherein said integrator includes means for integrating said capacitance signal from said hydrodynamic bearing over a period of time to compare said signal to said preset standard.

7. A hydrodynamic bearing as claimed in claim 4 wherein said shaft has first and second ends;

a thrust plate supported at or near one end of said shaft, said thrust plate extending into a gap defined by said sleeve so that said hydrodynamic bearing gap include a first gap region between an upper surface of said thrust plate and a lower surface of said sleeve, a second region between an end surface of said thrust plate and an inner surface of said sleeve, and a third region comprising a lower surface of said thrust plate and an upper facing surface of said sleeve, and said capacitance detector monitoring capacitance across at least one portion of said first, second and third regions.

8. A hydrodynamic bearing as claimed in claim 7 including an insulating layer extending laterally through said thrust plate from a center of said shaft to an outer edge of said thrust plate effectively dividing said thrust plate into upper and lower halves, each of said upper and lower halves defining a separate capacitor, and means for comparing the capacitance in each of said first and second capacitors to detect any change in orientation of said thrust plate relative to said sleeve.

9. A hydrodynamic bearing as claimed in claim 7 including an insulating layer extending vertically along a center axis of said shaft effectively dividing said capacitor into first and second segments, and first and second capacitance detector for monitoring the capacitance across the gap between said shaft and said sleeve for each of said first and second capacitance detectors, and means for comparing the outputs of said first and second capacitance detectors to detect any change in relative capacitance between said first and second sections to thereby effectively monitor the relative positioning of said shaft relative to said sleeve.

* * * * *